US006829018B2

(12) United States Patent
Lin et al.

(10) Patent No.: US 6,829,018 B2
(45) Date of Patent: Dec. 7, 2004

(54) THREE-DIMENSIONAL SOUND CREATION ASSISTED BY VISUAL INFORMATION

(75) Inventors: Yun-Ting Lin, Ossining, NY (US); Yong Yan, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 682 days.

(21) Appl. No.: 09/953,793

(22) Filed: Sep. 17, 2001

(65) Prior Publication Data

US 2003/0053680 A1 Mar. 20, 2003

(51) Int. Cl.[7] .......................... H04N 5/60; H04N 9/475
(52) U.S. Cl. ....................................... 348/738; 348/515
(58) Field of Search ................................ 348/738, 515, 348/462, 483, 485, 481; 381/1–5, 17–23, 300, 306, 307, 310; H04N 5/60, 9/475

(56) References Cited

U.S. PATENT DOCUMENTS 5,335,011 A 8/1994 Addeo et al. ................ 348/15
5,412,738 A 5/1995 Brunelli et al. ............ 382/115
5,438,623 A 8/1995 Begault ....................... 381/17
5,572,261 A * 11/1996 Cooper ....................... 348/515
5,768,393 A * 6/1998 Mukojima et al. ............ 381/17
5,940,118 A 8/1999 Van Schyndel ................ 348/1
6,005,946 A 12/1999 Varga et al. .................. 381/17
6,504,933 B1 * 1/2003 Chung ........................... 381/1
6,697,120 B1 * 2/2004 Haisma et al. ............. 348/515

* cited by examiner

*Primary Examiner*—Sherrie Hsia

(57) ABSTRACT

A sound imaging system and method for generating multi-channel audio data from an audio/video signal having an audio component and a video component. The system comprises: a system for associating sound sources within the audio component to video objects within the video component of the audio/video signal; a system for determining position information of each sound source based on a position of the associated video object in the video component; and a system for assigning sound sources to audio channels based on the position information of each sound source.

27 Claims, 2 Drawing Sheets

THREE-DIMENSIONAL SOUND CREATION ASSISTED BY VISUAL INFORMATION

BACKGROUND OF THE INVENTION

1. Technical Field

The present invention relates to sound imaging systems, and more specifically relates to a system and method for creating a multi-channel sound image using video image information.

2. Related Art

As new multimedia technologies such as streaming video, interactive web content, surround sound and high definition television enter and dominate the marketplace, efficient mechanisms for delivering high quality multimedia content have become more and more important. In particular, the ability to deliver rich audio/visual information, often over a limited bandwidth channel, remains an ongoing challenge.

One of the problems associated with existing audio/visual applications involves the limited audio data made available. Specifically, audio data is often generated or delivered via only one (i.e., mono), or at most two (i.e., stereo) audio channels. However, in order to create a realistic experience, multiple audio channels are preferred. One way to achieve additional audio channels is to split up the existing channel or channels. Existing methods of splitting audio content include mono-to-stereo conversion systems, and systems that re-mix the available audio channels to create new channels. U.S. Pat. No. 6,005,946, entitled "Method and Apparatus For Generating A Multi-Channel Signal From A Mono Signal," issued on Dec. 21, 1999, which is hereby incorporated by reference, teaches such a system.

Unfortunately, such systems often fail to provide an accurate sound image that matches the accompanying video image. Ideally, a sound image should provide a virtual sound stage in which each audio source sounds like it is coming from its actual location in the three dimensional space being shown in the accompanying video image. In the above-mentioned prior art systems, if the original sound recording did not account for the spatial relation of the sound sources, a correct sound image is impossible to re-create. Accordingly, a need exists for a system that can create a robust multi-channel sound image from a limited (e.g., mono or stereo) audio source.

SUMMARY OF THE INVENTION

The present invention addresses the above-mentioned needs, as well as others, by providing an audio-visual information system that can generate a three-dimensional (3-D) sound image from a mono audio signal by analyzing the accompanying visual information. In a first aspect, the invention provides a sound imaging system for generating multi-channel audio data from an audio/video signal having an audio component and a video component, the system comprising: a system for associating sound sources within the audio component to video objects within the video component of the audio/video signal; a system for determining position information of each sound source based on a position of the associated video object in the video component; and a system for assigning sound sources to audio channels based on the position information of each sound source.

In a second aspect, the invention provides a program product stored on a recordable medium, which when executed generates multi-channel audio data from an audio/video signal having an audio component and a video component, the program product comprising: program code configured to associate sound sources within the audio component to video objects within the video component of the audio/video signal; program code configured to determine position information of each sound source based on a position of the associated video object in the video component; and program code configured to assign sound sources to audio channels based on the position information of each sound source.

In a third aspect, the invention provides a decoder having a sound imaging system for generating multi-channel audio data from an audio/video signal having an audio component and a video component, the decoder comprising: a system for extracting sound sources from the audio component; a system for extracting video objects from the video component; a system for matching sound sources to video objects; a system for determining position information of each sound source based on a position of the matched video object in the video component; and a system for assigning sound sources to audio channels based on the position information of each sound source.

In a fourth aspect, the invention provides a method of generating multi-channel audio data from an audio/video signal having an audio component and a video component, the method comprising the steps of: associating sound sources within the audio component to video objects within the video component of the audio/video signal; determining position information of each sound source based on a position of the associated video object in the video component; and assigning sound sources to audio channels based on the position information of each sound source.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE INVENTION

Figure 1:
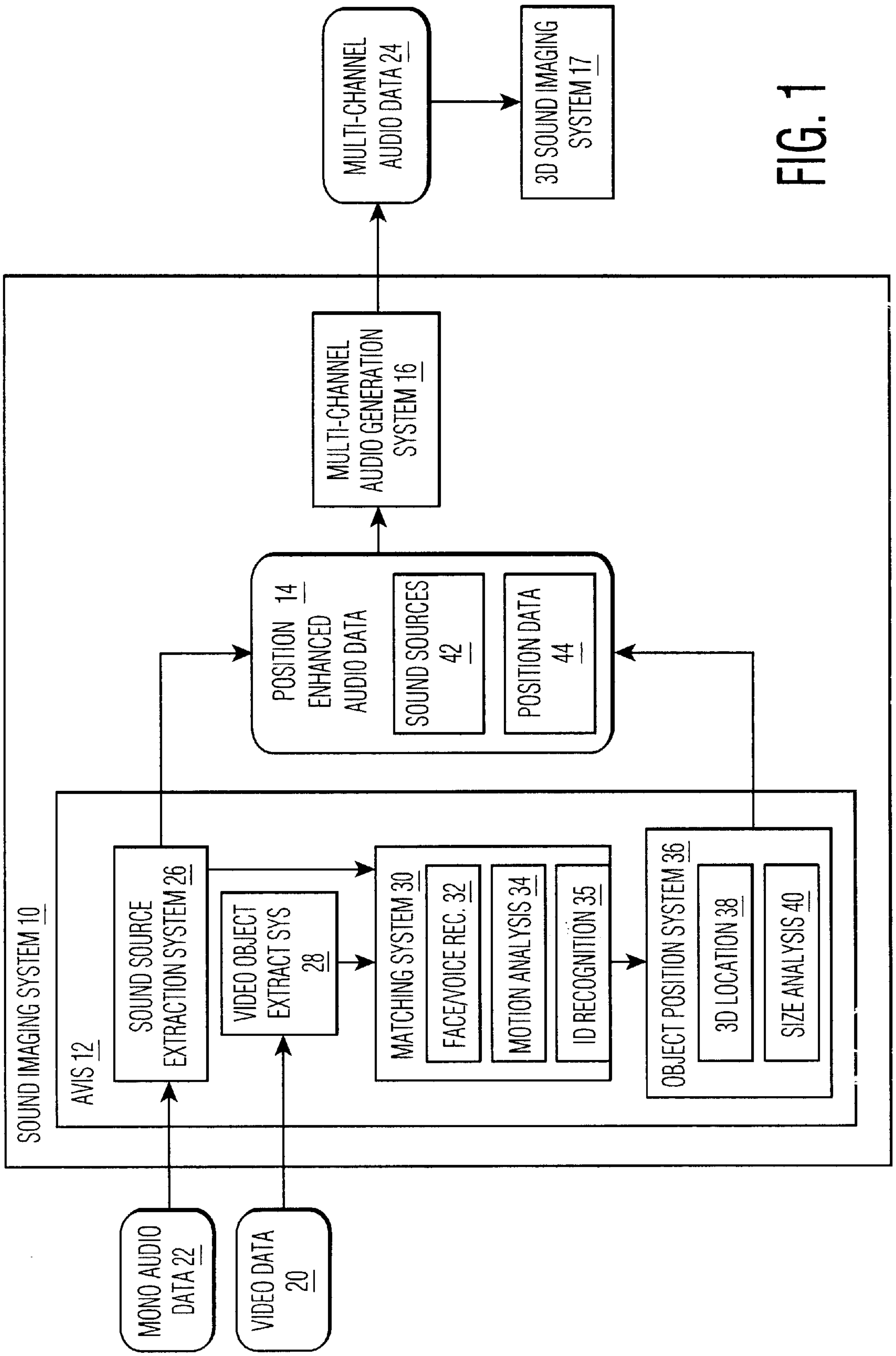
FIG. 1 depicts a sound imaging system for generating a realistic multi-channel sound image in accordance with a preferred embodiment of the present invention.

Referring now to the figures, FIG. 1 depicts a sound imaging system 10 that generates a multi-channel audio signal from a mono audio signal using the associated video information. More particularly, a system for creating or reproducing 3-D sound is provided by use of multiple audio channels based on the positioning information. As shown, sound imaging system 10 receives mono audio data 22 and video data 20, processes the data, and outputs multi-channel audio data 24. It should be understood that the mono audio data 22 and video data 20 may comprise pre-recorded data (e.g., an already-produced television program), or a live signal (e.g., a teleconferencing application) produced from an optical device. Sound imaging system 10 comprises an audio-visual information system (AVIS) 12 that creates position enhanced audio data 14 that contains sound sources 42 and position data 44 of the sound sources. Sound imaging system 10 also includes a multi-channel audio generation system 16 that converts the position enhanced audio data 14 into multi-channel audio data 24, which can be played by a three dimensional sound reproduction system 17, such as a multi-speaker audio system, to provide a realistic sound image. While the example depicted in FIG. 1 describes a system in which a mono audio signal is converted to a multi-channel audio signal, it is understood that the system could be implemented to convert a first multi-channel audio signal (e.g., a stereo signal) into a second multi-channel audio signal (e.g., a five-channel signal) without departing from the scope of the invention.

Audio-video information system 12 includes a sound source extraction system 26, a video object extraction system 28, a matching system 30, and an object position system 36. Sound source extraction system 26 extracts different sound sources from the mono audio data 22. In the preferred embodiment, sound sources typically comprise voices. However, it should be recognized that any other sound source could be extracted pursuant to the invention (e.g., a dog barking, automobile traffic, different musical instruments, etc.). Sound sources can be extracted in any known manner, e.g., by identifying waveform shapes, harmonics, frequencies, etc. Thus, a human voice may be readily identifiable using known voice recognition techniques. Once the various sound sources from the mono audio data 22 are extracted, they are separately identified, e.g., as individual sound source data objects, for further processing.

Video object extraction system 28 extracts various video objects from the video data 20. In a preferred embodiment, video objects will comprise human faces, which can be uniquely identified and extracted from the video data 20. However, it should be understood that other video objects, e.g., a dog, a car, etc., could be extracted and utilized within the scope of the invention. Techniques for isolating video objects are well known in the art and include systems such as those that utilize MPEG-4 technology. Once the various video objects are extracted, they are also separately identified, e.g., as individual video data objects, for further processing.

Once the extracted video and sound source data objects are obtained, they are fed into a matching system 30. Matching system 30 attempts to match each sound source with a video object using any known matching technique. Exemplary techniques for matching sound sources to video objects include face and voice recognition 32, motion analysis 34, and identifier recognition 35, which are described below. It should be understood, however, that the exemplary matching systems described with reference to FIG. 1 are not limiting on the scope of the invention, and other matching systems could be utilized.

Face and voice recognition system 32 may be implemented in a manner taught in U.S. Pat. No. 5,412,738, entitled "Recognition System, Particularly For Recognising [sic] People," issued on May 2, 1995, which is hereby incorporated by reference. In this reference, a system for identifying voice-face pairs from aural and video information is described. Thus, in a preferred embodiment, it is not necessary to store all recognized faces and voices. Rather, it is only necessary to distinguish one face from another, and one voice from another. This can be achieved, for instance, by analyzing the spatial separability of faces in the video data and temporal separability of voices (assuming two people do not speak at the same time) in the audio data. Accurate matching of voice-face pairs can then be achieved since matching voices and faces will co-exist in the temporal domain.

As an alternative embodiment, face and voice recognition system 32 may be implemented by utilizing a database of known face/voice pairs so that known faces can be readily linked to known voices. For instance, face and voice recognition system 32 may operate by: (1) analyzing one or more extracted "face" video objects and identifying each face from a plurality of known faces in a face recognition system; (2) analyzing one or more extracted "voice" sound sources and identifying each voice from a plurality of known voices in a voice recognition system; and (3) determining which face belongs to which voice by, for example, examining a database of known face/voice pairs. Other types of predetermined video object/sound source recognition systems could likewise be implemented (e.g., a recognized drum set video object could be extracted and matched to a recognized drum sound source).

Motion analysis system 34 does not rely on a database of known video object/sound source pairings, but rather matches sound sources to video objects based on a type of motion of the video objects. For example, motion analysis system 34 may comprise a system for recognizing the occurrence of lip motion in a face image, and matching the lip motion with a related extracted sound source (i.e., a voice). Similarly, a moving car image could be matched to a car engine sound source.

Identifier recognition system 35 utilizes a database of known sound sources and video object identifiers (e.g., a number on a uniform, a bar code, a color coding, etc.) that exist proximate or in video objects to match the video objects with the sound sources. Thus, for example, a number on a uniform could be used to match the person wearing the uniform with a recognized voice of the person.

Once each extracted sound source has been matched with an associated video object, the information is passed to object position system 36, which determines the position of each object, and therefore the position of each sound source. Exemplary systems for determining the position of each object include a 3-D location system 38. 3-D location system 38 determines a 3-D location for each video object/sound source matching pair. This can be achieved, for instance, by determining a relative location in a virtual room.

Figure 2:
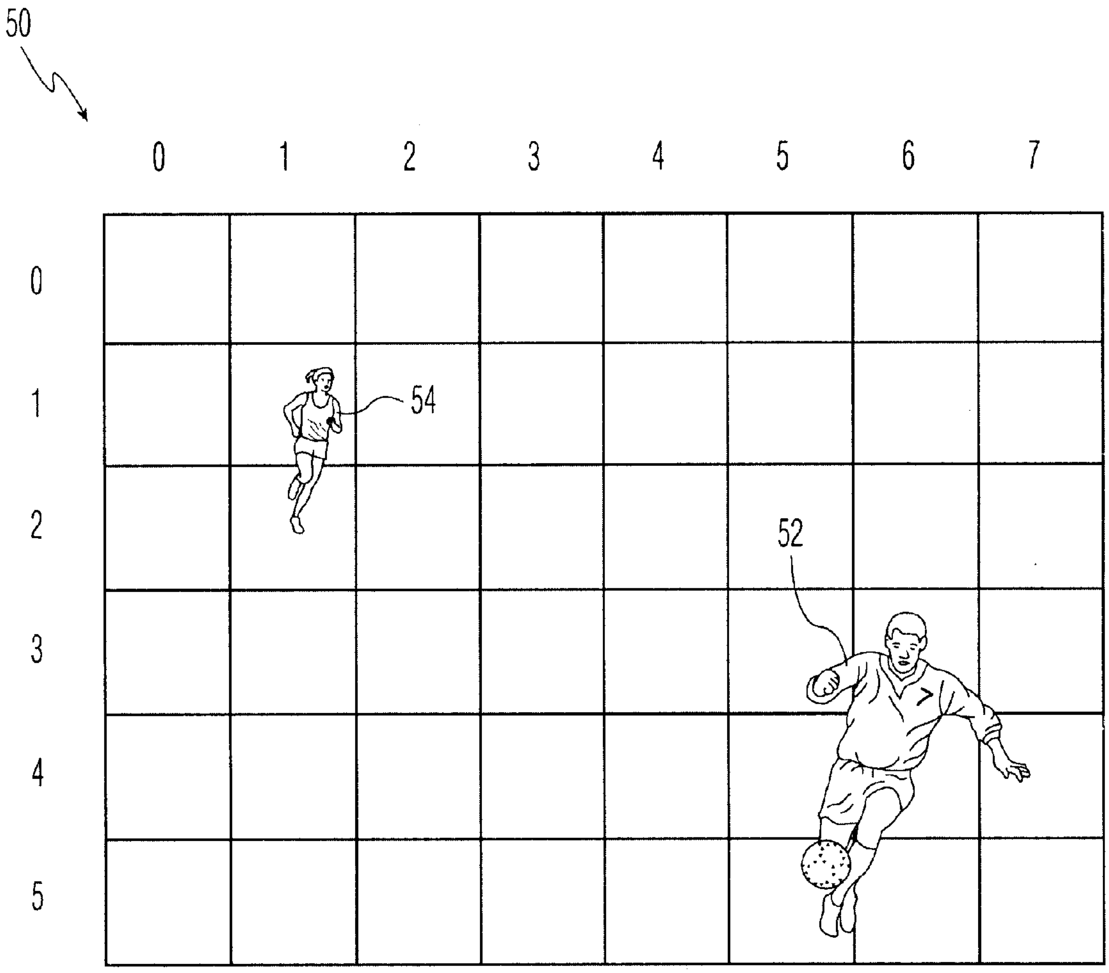
FIG. 2 depicts a system for determining a position of a sound source in accordance with the present invention.

A simple method of determining a 3-D location is described with reference to FIG. 2. FIG. 2 depicts a video image 50 that has been divided into a grid comprised of eight vertical columns numbered 0–7 and six horizontal rows numbered 0–5. Video image 50 is shown containing two video objects 52, 54 that were previously extracted and matched with associated sound sources (e.g., sound source 1 and sound source 2, respectively). As can be seen, video object 52 is a person located in the lower right portion of the video image, and having a face located in column 6, row 3 of the two dimensional grid. Video object 54 is a person located in the upper left hand portion of video image 50 and having a face located in column 1, row 1 of the two dimensional grid. Using this information, object position system 36 can generate position data 44 regarding the relative location of both video objects 52, 54.

In order to determine position data regarding a third dimension (i.e., depth), any known method could be utilized. For instance, size analysis system 40 could be used to determine the relative depth position of different objects in a three dimensional space based on the relative size of the video objects. In FIG. 2, it can be seen that video object 52 depicts a person that is somewhat larger than video object 54, which depicts a second person. Accordingly, it can be readily determined that video object 52 is closer to the viewer than video object 54. Thus, the sound source associated with video object 52 can be assigned to a channel, or mix of channels, that would provide a sound image that is nearby the viewer, while the sound source associated with video object 54 could be assigned to a mix of audio channels that provide a distant sound image. To implement size analysis system 40, the size of similar objects (e.g., two or more people, two or more automobiles, two or more dogs, etc.) can be measured, and then based on the different relative sizes of the similar video objects, the objects could be located at different depths in a 3-D space.

As an alternative, a system could be implemented that reconstructs a virtual 3-D space based on the two dimensional video image 50. While such reconstruction techniques tend to be computationally intensive, they may be preferred in some applications. Nonetheless, it should be recognized that any system for locating video objects in a space, two-dimensional or three dimensional, is within the scope of this invention.

Knowing: (1) the three-dimensional position data of each video object 52, 54, and (2) which sound source is associated with which video object (e.g., video object 52 is matched with sound source 1, and video object 54 is matched with sound source 2), the relative position of each sound source is known. Each sound source can then be assigned to an appropriate audio channel in order to create a realistic 3-D sound image. It should be understood that while a 3-D location of each sound source is preferred, the invention could be implemented with only two-dimensional (2-D) data for each sound source. The 2-D case may be particularly useful when computational resources are limited.

Referring back to FIG. 1, once the position of the visual objects has been determined, the audio visual information system 12 will output position enhanced audio data 14 that includes the isolated sound sources 42 and the position data of each of the sound sources 44. The sound sources 42 and position data 44 are then fed into a multi-channel audio generation system 16 that assigns the sound sources to the various channels. Multi-channel audio generation system 16 can be implemented in any known manner, and such systems are known in the art. Multi-channel audio generation system 16 then outputs multi-channel audio data 24, which can then be inputted into a 3-D sound reproduction system 17 such as a multi-channel audio-visual system.

It should be understood that once the multi-channel data is generated, any known method for creating a 3-D sound reproduction could be utilized. For instance, a system comprised of multiple speakers located in predetermined positions could be implemented. Other systems are described in U.S. Pat. No. 6,038,330, "Virtual Sound Headset And Method For Simulating Spatial Sound," and U.S. Pat. No. 6,125,115, "Teleconferencing Method And Apparatus With Three-Dimensional Sound Positioning," which are hereby incorporated by reference.

Similarly, U.S. Pat. No. 5,438,623, issued to Begault, which is hereby incorporated by reference, discloses a multi-channel spatialization system for audio signals utilizing head related transfer functions (HRTF's) for producing three-dimensional audio signals. The stated objectives of the disclosed apparatus and associated method include, but are not limited to: producing 3-dimensional audio signals that appear to come from separate and discrete positions from about the head of a listener; and to reprogrammably distribute simultaneous incoming audio signals at different locations about the head of a listener wearing headphones. Begault indicates that the stated objectives are achieved by generating synthetic HRTFs for imposing reprogrammable spatial cues to a plurality of audio input signals received simultaneously by the use of interchangeable programmable read-only memories (PROMs) that store both head related transfer function impulse response data and source positional information for a plurality of desired virtual source locations. The analog inputs of the audio signals are filtered and converted to digital signals from which synthetic head related transfer functions are generated in the form of linear phase finite impulse response filters. The outputs of the impulse response filters arc subsequently reconverted to analog signals, filtered, mixed and fed to a pair of headphones. Another aspect of the disclosed invention is to employ a simplified method for generating synthetic HRTFs so as to minimize the quantity of data necessary for HRTF generation.

It is understood that the systems, functions, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

What is claimed is:

1. A sound imaging system for generating a three-dimensional sound image from an audio/video signal having an audio component and a video component, the system comprising:

- a system for associating sound sources within the audio component to video objects within the video component of the audio/video signal;
- a system for determining position information of each sound source based on a position of the associated video object in the video component; and
- a system for assigning sound sources to audio channels based on the position information of each sound source.

2. The sound imaging system of claim 1, wherein the system for associating sound sources includes:

- a video object extraction system;
- a sound source extraction system; and
- a system for matching extracted video objects to extracted sound sources.

3. The sound imaging system of claim 2, wherein the extracted video objects comprise faces and the extracted sound sources comprise voices.

4. The sound imaging system of claim 1, wherein the system for associating sound sources includes a system for matching lip movements to voices.

5. The sound imaging system of claim 1, wherein the position information comprises three-dimensional position data derived from a two-dimensional image frame in the video component.

6. The sound imaging system of claim 5, wherein the position information is further determined based on a relative size of the sound source.

7. The sound imaging system of claim 1, wherein the position information is determined from a three-dimensional reconstruction of the video component.

8. The sound imaging system of claim 1, wherein the audio component is a mono audio signal.

9. The sound imaging system of claim 1, wherein each audio channel is associated with a speaker location.

10. The sound imaging system of claim 1, wherein the audio/video signal comprises live data.

11. The sound imaging system of claim 1, wherein the audio/video signal comprises pre-recorded audio/video data.

12. A program product stored on a recordable medium, which when executed generates multi-channel audio data from an audio/video signal having an audio component and a video component, the program product comprising:

program code configured to associate sound sources within the audio component to video objects within the video component of the audio/video signal;

program code configured to determine position information of each sound source based on a position of the associated video object in the video component; and program code configured to assign sound sources to audio channels based on the position information of each sound source.

13. The program product of claim 12, wherein the program code configured to associate sound sources includes:

a video object extraction system;

a sound source extraction system; and a system for matching extracted video objects to extracted sound sources.

14. The program product of claim 13, wherein the extracted video objects comprise faces and the extracted sound sources comprise voices.

15. The program product of claim 12, wherein the program code configured to associate sound sources includes a system for matching lip movements to voices.

16. The program product of claim 12, wherein the audio component comprises a mono audio signal.

17. A decoder having a sound imaging system for generating multi-channel audio data from an audio/video signal having an audio component and a video component, the decoder comprising:

a system for extracting sound sources from the audio component;

a system for extracting video objects from the video component;

a system for matching extracted sound sources to extracted video objects;

a system for determining position information of each sound source based on a position of the matched video object in the video component; and a system for assigning sound sources to audio channels based on the position information of each sound source.

18. A method of generating multi-channel audio data from an audio/video signal having an audio component and a video component, the method comprising the steps of:

associating sound sources within the audio component to video objects within the video component of the audio/video signal;

determining position information of each sound source based on a position of the associated video object in the video component; and assigning sound sources to audio channels based on the position information of each sound source.

19. The method of claim 18, wherein the step of associating sound sources includes the steps of:

distinguishing a face from other faces;

distinguishing a voice from other voices; and matching the distinguished voice with the distinguished face.

20. The method of claim 19, wherein the face is distinguished from the other faces based on a spatial separability of the face from the other faces.

21. The method of claim 20, wherein the voice is distinguished from the other voices based on a temporal separability of the voice from the other voices.

22. The method of claim 21, wherein the matching of the distinguished voice with the distinguished face is achieved based on a temporal co-existence of the distinguished voice with the distinguished face.

23. The method of claim 18, wherein the step of associating sound sources includes the step of matching lip movements to voices.

24. The method of claim 18, wherein the step of determining the position information includes locating the sound source in a three-dimensional space in the video component.

25. The method of claim 18, wherein the step of determining position information includes the further step of determining a relative size of the sound source.

26. The method of claim 18, wherein the step of determining position information includes generating a three-dimensional reconstruction of the video component.

27. The method of claim 18, comprising the further step of associating each audio channel with a speaker location.

* * * * *